United Sta [11] 3,558,895

[72] Inventor Rudolf Hartmann
Skokie, Ill.
[21] Appl. No. 780,095
[22] Filed Nov. 29, 1968
[45] Patented Jan. 26, 1971
[73] Assignee Bell & Howell Company
Chicago, Ill.
a corporation of Illinois

[54] LIGHT SENSOR WITH OPTICAL LIGHT PIPING
16 Claims, 3 Drawing Figs.
[52] U.S. Cl. .................................. 250/220,
250/227, 250/237
[51] Int. Cl. ..................................... G02b 5/16,
H01j 39/12
[50] Field of Search ............................ 250/227,
208, 209, 237, 220

References Cited
UNITED STATES PATENTS

| | | | |
|---|---|---|---|
| 2,938,666 | 5/1960 | Rand | 250/227X |
| 3,114,283 | 12/1963 | Gruner | 250/227X |
| 3,372,240 | 3/1968 | Boyers et al. | 250/227X |
| 3,407,304 | 10/1968 | Kinard et al. | 250/227X |
| 3,436,757 | 4/1969 | Schwab | 250/227X |
| 3,483,389 | 12/1969 | Cronin | 250/227X |

*Primary Examiner*—Roy Lake
*Assistant Examiner*—C. R. Campbell
*Attorney*—William F. Pinsak

ABSTRACT: An adjustable mount adapted to selectively align exit faces of a plurality of optical fibers with a transducer to enable remote readout of light intensity at the entrant face of each fiber.

PATENTED JAN 26 1971
3,558,895
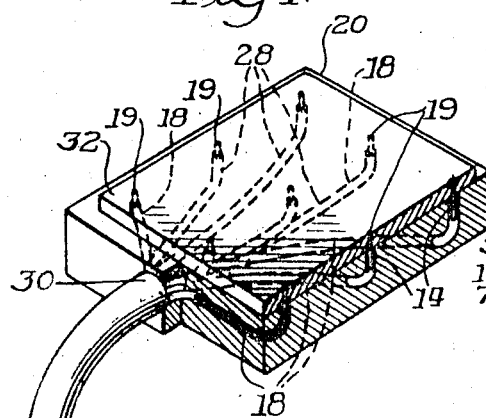
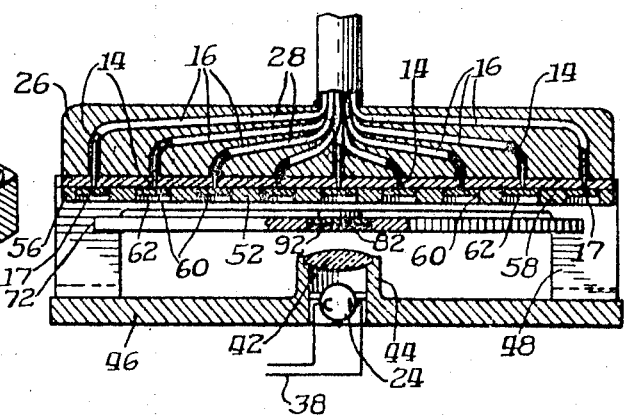
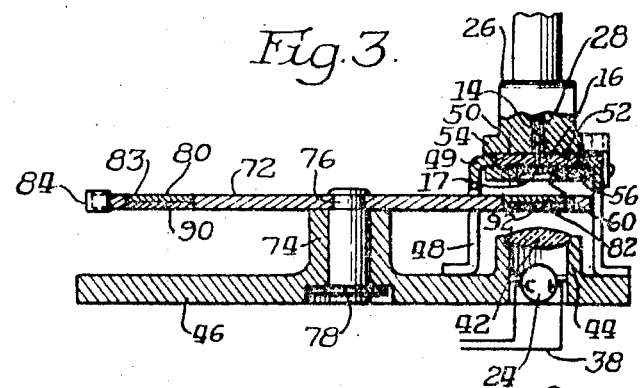
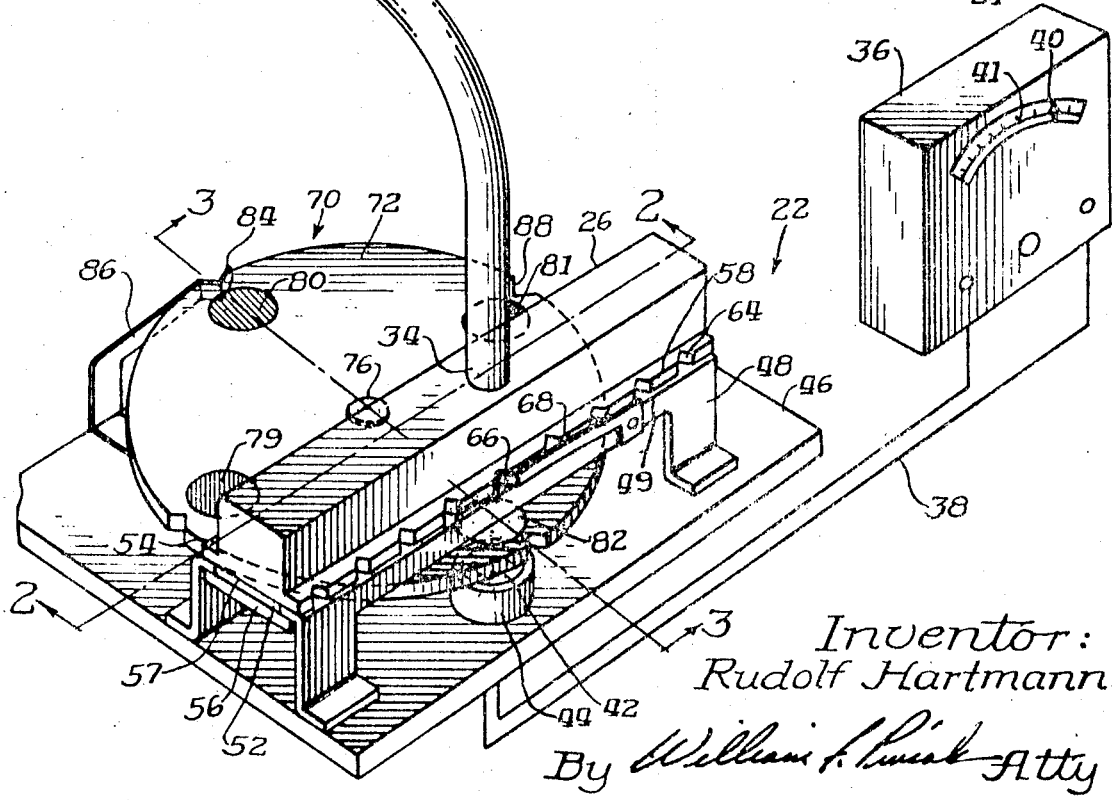
Inventor:
Rudolf Hartmann.
By William F. Pinsak Atty

LIGHT SENSOR WITH OPTICAL LIGHT PIPING

The present invention relates to light sensing. Particularly, the invention relates to apparatus for sensing light from a plurality of small stations.

Measurement of incident light at small stations such as those found in apertures in cameras, projectors and film printers conventionally has been attended with problems arising from difficulty of accessibility. Space limitations within such devices prevent accurate positioning of heretofore known photodetectors (light detectors) while scanning of an aperture for measurements at a plurality of stations has been practically impossible because known scanning mechanisms are larger than photodetectors.

The nature of the problem is perhaps more readily appreciated by considering a conventional film printer. In such a device, raw film stock is exposed, frame by frame, to modulated light passed through an original developed negative to produce a printed film. The modulation of the light is intended to normalize lighting in the printed film by overcoming the effect of undesired variation in hue and intensity presented in the negative. The station in the printer at which the light is passed from its source through the negative is its aperture, and an exceedingly small opening, approximating the size of a film frame. To produce proper light effects in the finished product, it is required that the quantity of light at all positions in the aperture be uniform for each frame, as variations would tend to defeat the purpose of the normalizing process intended to be effected by the printer.

An object of the present invention is to detect and measure light at small conventionally inaccessible stations.

Another object of the invention is to measure light from any selected of a plurality of small stations at which light is simultaneously detected.

A further object of the invention is to utilize light energy, for example, to determine its intensity remotely from a station at which the light is detected.

The foregoing objects are effected in accordance with the present invention by providing a sensor for light which comprises a plurality of optical fibers. Each fiber has an entrant face arranged for light reception from an associated station and an exit face for output of light from such station. Means including a light transducer disposed remote from the light stations enable utilization of fiber transmitted light. Means are provided for selectively aligning each exit face with the light transducer to the end that the light transmitted by an fiber can be utilized.

In accordance with one feature of the invention the entrant faces of the fibers are mounted in uniformly spaced relationship in a holder which is adapted to be positioned in a light aperture, such as the aperture in a film printer. Accordingly, light intensity at uniformly separated positions or stations within the aperture can be compared by readout on the utilizing device, such as a photometer.

Another feature of the invention enables separation of light from each station into its various color components for determining the intensity thereof. In consequence, the quality of the light at each station as well as its quantity can be determined remotely from the sensing stations.

Further and other objects will be apparent from the description of the accompanying drawings in which like numerals refer to like parts.

In the drawings:

FIG. 1 is a perspective view of apparatus embodying the present invention, with parts broken away for illustration;

FIG. 2 is a sectional view taken along the line 2—2 of FIG. 1; and

FIG. 3 is a sectional view taken along the line 3—3 of FIG. 2.

Referring now more particularly to the drawings, a sensor, generally designated 10, for light at a plurality of stations (not shown) comprises a wrapped bundle 12 of optical fibers 14 (only some of which and their components have been numbered). Each of said fibers has an input end portion 18 with an entrant face 19 (FIG. 1) arranged for light reception from and an output end portion 16 with an exit face 17 (FIG. 2) arranged for light output from, a respective of said stations. These stations may be relatively widely spaced apart from each other or close together, such as, for example, in the aperture of the aperture plate of a film printer for which the exemplary device is adapted. However, if widely spaced from one another, then holder 20, hereinafter to be described, may be omitted.

Each of the optical fibers is shown as being enclosed in a sheath 28 of conventional plastic composition which terminates short of its associated exit and entrant faces 17 and 19. These sheaths project outwardly from opposed input and output end portions 30 and 34 of the cover defining bundle 12 about fiber end portions 16 and 18 and thereby enable an optional arrangement of the entrant and exit faces of the fibers.

Holder 20, which may be a suitable plastic or hard elastomeric composition such as silicon rubber, comprises holding means in which input end portions 18 are potted to hold entrant faces 19 in predetermined relative spaced-apart disposition. In the present embodiment, the entrant faces are uniformly spaced one from the other on a light proximate face of an adapter or key 32 which is fashioned integrally with the holder and may be proportioned for reception in a light passing aperture. This enables sampling of the light intensity at positions in such aperture corresponding to entrant faces 19.

A mount 26 means for selectively associating each exit face with a light transducer 24 for light utilization. For that purpose, said mount has an elongated body from the top of which the bundle 12 extends upwardly and in which output end portions 16 of the fibers are rigidly secured. If desired, the mount may be fabricated from any suitable plastic or hard elastomeric material such as silicon rubber, in which the fibers are potted to hold exit faces 17 in predetermined positions, preferable for projection of light vertically downwardly. Herein said exit faces are spaced apart in linear alignment longitudinally of said mount. Transducer 24 is included in means generally designated 22 for utilizing fiber transmitted light, and is disposed remote from entrant faces 19. Said transducer may be of any known construction, such as is embodied in a generative, photoresistive, photomultiplier, or phototube photodetector. The details of construction of the transducer are not critical to the invention, its function being to convert the photon output from exit faces into electrons.

Utilizing means 22 also includes a device 36 for using the electron output of transducer 24. Exemplary device 36 is an amplifier-photometer which is operatively connected through circuit 38 with transducer 24 to the end that the current generated by said transducer will cause movement of a photometer indicator 40 enabling readout on scale 41 of intensity of light emitted from any of selected faces 17. The details of construction of the amplifier-photometer are not limiting on the invention, and accordingly, further description is omitted.

Light collimating lens or element 42 is arranged to pass light from a selected exit face 17 toward transducer 24. For that purpose, the lens is mounted in the end of tube 44 which may be fashioned integrally and project upwardly from base 46 for holding the lens in optical alignment with, and in spaced-apart relationship from, said transducer.

An elongated stand 48, which has the shape of an inverted "U" in cross section, comprises track means with an upper medial section or track 49 which is supported from the base above lens 42. Said track has a slot 50 which extends longitudinally of the alignment of faces 17 in mount 26. The lower end portion of said mount is restricted to form an elongated spline or slide 52 which is disposed in the slot 50 and proportioned to enable the mount to move longitudinally of track 49 to selectively align the exit faces with transducer 24. Movement of slide 52 is facilitated by a pair of bearing shoulders 54 and 58 which are fast with said mount and arranged on opposite side of slot 50 in sliding engagement with the upper surface of the track 49.

Exit faces 17 herein are shown as terminating at the lower faces 57 of slide 52. Attenuating means comprised of a plate 56 forms a cover over the lower face of slide 52 on which said plate is secured. Plate 56 is proportioned for extension beyond the sides of slot 50 and is disposed in bearing engagement with the underside of track 49. Thereby, said plate functions to hold mount 26 in said track by preventing its upward removal.

Plate 56 has a light passing aperture 60 (only some of which are numbered) extending vertically therethrough in alignment with each exit face 17. The diameter of each aperture preferable is greater than the diameter of its associated exit face. An attenuator 62 which herein comprises a neutral density disc-shaped filter is disposed in each aperture 60 normal to the path of light emitted from, and over an associated exit face. The attenuators are adapted to normalize light output differences from exit faces 17 resulting from variation in transmittance characteristics of fibers 14.

The spacing of exit faces 17 longitudinally of mount 26 is such that only one fiber at a time can be optically aligned with the lens 42, to the end that selective alignment of exit faces with transducer 24 is most effective. To prevent misalignment of the mount with lens 42, shoulder 58 is fashioned as an indexing member, that is, a rack bar with a plurality of external aligned notches 64 spaced longitudinally of mount 26. A detent 66 urged toward mount 26, is carried from one end of a spring arm 68 which has an opposite end adjustable secured to the stand 48. The detent is fashioned for mount holding engagement in any selected of notches 64 and disengagement therefrom upon application of manual force to move the mount in either longitudinal direction.

The apparatus aforedescribed comprises complete means for remotely measuring the intensity of light from a plurality of stations. However, such apparatus can be further adapted for measuring the quality of the light from each station. In the illustrated apparatus, this is achieved through the agency of filter means generally designated 70 and comprising a turret in the form of a disc 72 which is constrained in a horizontal plane for rotation with a vertical spindle 76. The latter is journaled in a bearing sleeve 74 which projects upwardly from base 46 as an integral extension and may be interruptible power driven by any suitable means 78.

Disc 72 has a plurality of apertures 83 which project vertically therethrough and preferable are equally angularly spaced, one from another, at a uniform radial distance from the center of disc rotation. Color elements or filters 79, 80 and 81, each adapted for passing light of a different primary color, are mounted respectively in three of the apertures 83. A plain element or glass 82 for passing while light unaffectedly is mounted in a fourth of the apertures 83. The horizontal level of disc 72 is below track 49; and said disc is proportioned and arranged to enable each aperture 83 to be aligned between plate 56 and lens 42, permitting any selected aperture to be vertically aligned with any selected exit face 17 and the transducer 24. In consequence of the foregoing, the intensity of various hue factors of light at any sensed station can be determined.

Exemplary indexing means for suitably aligning a selected of the elements 79, 80, 81 and 82 in operative position comprises a detent 84 spring-urged toward disc 72, which is carried on the end of spring arm 86, suitable supported from base 46. The detent is fashioned for engagement in selected of a plurality of outwardly opening notches 88 formed in the circumference of disc 72, and for disengagement from such notches upon manual application of torque to move said disc in either angular direction.

Transducer 24 may not have the same level of sensitivity to all hues. Compensation for such variation in spectral sensitivity may be through the agency of neutral density filters, of which as few as one may be used if sufficient for the normalizing requirement. Herein, exemplary neutral density filters 90 and 92 are shown arranged in the light paths through elements 80 and 82, respectively, and mounted adjacent thereto. By reason of the foregoing, accurate remote measurement of both quantity and quality of light in heretofore practically inaccessible places can be achieved with relative ease.

I claim:

1. A sensor for light at a plurality of stations comprising:
   a plurality of optical fibers, each having an entrant face arranged for light reception, and an exit fact for output received by its entrant face from a respective station;
   attenuating means disposed over said exit faces for normalizing light output differences resulting from variation in light transmittance characteristics of said fibers;
   means including a light transducer associated with said exit faces for utilizing fiber transmitted normalized light; and
   means for selectively aligning each exit face with said light transducer.

2. A combination according to claim 1 in which said aligning means comprises a mount arranged for adjustment relative said transducer, said exit faces carried by said mount for selective alignment with said transducer as said mount is adjusted.

3. A combination according to claim 2 further comprising a base, and a member supported from said base and spaced from said mount for passing light from said exit faces toward said transducer.

4. A combination according to claim 3 in which said exit faces are spaced apart in alignment remote from said entrant faces and further comprising track means supported from said base for guiding said mount over said member.

5. A combination according to claim 2 further comprising indexing means carried from said mount for effecting alignment of said exit faces with said transducer.

6. A combination according to claim 5 in which said indexing means includes a rack carried from said mount and a pawl urged for engagement with said rack to releasably hold said mount.

7. A combination according to claim 1 in which said attenuating means comprises a light attenuator fixed to said mount over each exit face.

8. A combination according to claim 3 in which said member comprises a light collimating lens arranged to pass light from said exit faces, said transducer comprising a photodetector fixed relative said base for converting the photon output passed by said lens into electrons.

9. A combination according to claim 1 further comprising a holder by which said entrant faces are mounted.

10. A combination according to claim 9 in which said entrant faces are uniformly disposed.

11. A combination according to claim 9 in which said holder has an adapter fashioned for reception in a light-passing aperture to enable sampling the quantity of light at positions in said aperture corresponding to said entrant faces.

12. A sensor for light at a plurality of stations comprising:
    a plurality of optical fibers, each having an entrant face arranged for light reception, and an exit face for output of light received by its entrant face from a respective of said stations;
    means including a light transducer associated with said exit faces for utilizing fiber transmitted light;
    means for selectively aligning each exit face with said light transducer; and
    filter means disposed adjacent said aligning means for passing light of predetermined hues toward said transducer from said exit faces.

13. A combination according to claim 12 in which said filter means comprises a turret with a plurality of color filters arranged for selective disposition between aligned said exit faces and said transducer.

14. A combination according to claim 13 in which said filter means includes a neutral density filter arranged in optical alignment with at least one color filter for adjusting the intensity of colored light according to variation in spectral sensitivity of said transducer.

15. A combination according to claim 13 in which said turret is fashioned as a rotatable disc with an outer notched edge for selectively indexing said color filters in alignment with said transducer and a selected exit face.

16. A combination according to claim 15 further comprising detent means for releasably holding said disc is in selected angular positions.